United States Patent
Huang (10) Patent No.: US 7,490,157 B2
(45) Date of Patent: Feb. 10, 2009

(54) SYSTEM AND METHOD FOR DEFINING INTERFACE OF MANUFACTURE EXECUTION SYSTEM

(75) Inventor: Hwa Shin Huang, Taoyuan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1421 days.

(21) Appl. No.: 10/666,715

(22) Filed: Sep. 15, 2003

(65) Prior Publication Data

US 2004/0187137 A1 Sep. 23, 2004

(30) Foreign Application Priority Data

Mar. 19, 2003 (TW) .............................. 92106107 A (51) Int. Cl.
*G06F 15/16* (2006.01)
*G06F 9/46* (2006.01)
(52) U.S. Cl. ...................... 709/230; 719/328; 719/329
(58) Field of Classification Search ................. 709/230; 719/328, 329
See application file for complete search history.

(56) References Cited

U.S. PATENT DOCUMENTS

| | | | | |
|---|---|---|---|---|
| 5,848,273 A | * | 12/1998 | Fontana et al. ............... 717/108 |
| 6,591,272 B1 | * | 7/2003 | Williams ...................... 707/102 |
| 6,631,519 B1 | * | 10/2003 | Nicholson et al. ........... 717/169 |
| 6,868,454 B1 | * | 3/2005 | Kubota et al. ................ 709/237 |
| 7,010,586 B1 | * | 3/2006 | Allavarpu et al. ........... 709/223 |
| 2002/0099738 A1 | * | 7/2002 | Grant ........................... 707/513 |
| 2003/0163450 A1 | * | 8/2003 | Borenstein et al. .............. 707/1 |
| 2004/0064820 A1 | * | 4/2004 | Bussiere et al. ............. 719/310 |
| 2004/0078788 A1 | * | 4/2004 | Wong ........................... 717/140 |
| 2004/0187137 A1 | * | 9/2004 | Huang .......................... 719/316 |
| 2004/0210914 A1 | * | 10/2004 | Kinner et al. ................ 719/330 |
| 2005/0022208 A1 | * | 1/2005 | Bolar et al. .................. 719/315 |

* cited by examiner

*Primary Examiner*—Krisna Lim
(74) *Attorney, Agent, or Firm*—Duane Morris LLP (57) ABSTRACT

A system and method for defining MES interface to process a transaction between a server and a client from an XML base, the transaction between the server and the client based on a communication protocol, the server having an MES, the system for defining the MES interface comprising an IDL file for executing a plurality of service objects of the MES, an XML tag set file, wherein the XML tag set file uses XML for defining interfaces of the plurality of service objects and an XML schema file, wherein the XML schema file is within a web server for validating an output content generated by executing IDL file and the XML tag set file, wherein the XML tag set file is adapted to serve at least one argument of the plurality of service objects within the IDL file.

13 Claims, 10 Drawing Sheets

Fig. 1

Prior Art

```
Module MES_Main{
    Interface Transaction_Tempalte{
        String SiView_Transaction(in String XML_Argv);
    }
}
```

```
 83   // define how transaction looks like line 87~101
 84   // every transaction has 3 attributes for id name, action type = (Inquery or ResultReply), function id
 85   // and 2 elements header & Contents
 86   // these attributes are filled out by client or server
 87
 88   <AttributeType name="ID" required="yes" dt:type="string"/>              ⎯510
 89   <AttributeType name="Action" dt:type="string" required="yes"/>          ⎯512
 90   <AttributeType name="FuncID" dt:type="string" required="yes"/>          ⎯514
 91   <ElementType name="Transaction" content="mixed">         ⎯515
 92       <attribute type="ID"/>        ⎯510'
 93       <attribute type="Action"/>    ⎯512'
 94       <attribute type="FuncID"/>    ⎯514'
 95   <element type="Header"/>
 96   <element type="Contents"/>         ⎯520
 97   </ElementType>                     ⎯540
 98
 99   // transactions may include many transaction
100   <ElementType name="Transactions" content="eltOnly">
101       <element type="Transaction"/>                        ⎯410'
102   </ElementType>
103
104   </Schema>
105
```

FIGURE 5a

```
46  //define header line 50~80
47  // Message has 2 attributes and message data
48  // 1. return code = rc
49  // 2. message id = msg_id
50  <AttributeType name="rc" required="yes" dt:type="string"/>           ~432
51  <AttributeType name="msg_id" required="yes" dt:type="string"/>       ~431
52  <ElementType name="Msg" content="eltOnly">
53      <attribute type="rc"/>                                            ~436
54      <attribute type="msg_id"/>
55  </ElementType>
56
57  // 2 attributes here to indicate "from which client or server node = node and system = sys"
58  <AttributeType name="node" required="yes" dt:type="string"/>         ~444
59  <AttributeType name="sys" required="yes" dt:type="string"/>          ~442
60  <ElementType name="From" content="eltOnly">
61      <attribute type="node"/>     ~440'
62      <attribute type="sys"/>      ~442'                                ~438
63  </ElementType>
64
65  // user has password => pwd as its attribute
66  <AttributeType name="pwd" required="yes" dt:type="string"/>          ~446
67  <ElementType name="User" content="eltOnly">
68      <attribute type="pwd"/>      ~446'                                ~444
69  </ElementType>
70
71  //define header line 50~80
72  // header has one attribute called serial number => sno
73  // and may have 3 elements User, From & Msg>Message
74  <AttributeType name="sno" required="yes" dt:type="string"/>          ~448
75  <ElementType name="Header" content="mixed">
76      <attribute type="sno"/>       ~448'                            ⎫
77      <element type="From"/>        ~438                             ⎬ 430'
78      <element type="Msg"/>         ~436                             ⎪
79      <element type="User"/>        ~444                             ⎭
80  </ElementType>
81
```

FIGURE 5b

```
// define lot features line 10 ~ 38
// lot has one attribue named lot id for replying result to client
// and many other features in trems of elements
// ex: hold state <AttributeType name="txt" required="yes" dt:type="string"/>  460
<ElementType name="HoldState" content="eltOnly">            } 458
  <attribute type="txt"/>  460'
</ElementType>

<ElementType name="any2" content="eltOnly">
  <attribute type="txt"/>  460'                              } 456
</ElementType>

<ElementType name="any3" content="eltOnly">
  <attribute type="txt"/>  460'                              } 454
</ElementType>

// lot has one atttribue named lot id for replying result to client
// and many other features in trems of elements
// ex: hold state
<AttributeType name="Lot_id" required="yes" dt:type="string"/>
<ElementType name="Lot" content="mixed">
  <attribute type="Lot_id"/>  460'
  <element type="HoldState"/>  458'                          } 452
  <element type="any2"/>  454'
  <element type="any3"/>  454'
</ElementType>

<ElementType name="Lots" content="eltOnly">                  } 450'
  <element type="Lot"/>  452'
</ElementType>
```

FIGURE 5c

```
 1  <?xml version="1.0" ?>
 2  <Transactions xmlns="x-schema:http://SomeWebServer/TestSchema.xml">
 3     // transactions may include many transaction
 4     // this XML has a schema file located at http://SomeWebServer     ─── 615
 5  <Transaction Id="LotInfoInq" Action="Inquiry" FuncID="0001">
 6     // every transaction has 3 attributes for id name, action type = (Inquery or ResultReply), function id
 7     // and 2 elements header & Contents
 8     // these attributes are filled out by client here
 9
10     <Header sno="00100">                                    ─── 622
11     // header has one attribute called serial number
12     // and 2 elements From & User            ─── 624
13        <From node="MyPC" sys="OMI" />
14        // 2 attributes here to indicate "from which client node = node and system = sys"
15        <User pwd="123">ABC</User>          ─── 626
16        // user "ABC" has password "123" as its attribute
17     </Header>
18     <Contents>
19     //contents may have many lots as it content
20        <Lots>
21        // one of its lot                                ─── 632
22           <Lot lot_id="ABC100.00">  // lot has one attribue named lot id for client input
23              <any2 txt="1" />       // and other necessary input argument, if any
24              <any3 txt="2" />       // and other necessary input argument, if any
25           </Lot>
26        </Lots>
27     </Contents>
28  </Transaction>
29  </Transactions>
```

FIGURE 6

```
<?xml version="1.0" ?>
<Transactions xmlns="x-schema:http://SomeWebServer/TestSchema.xml">
    // transactions may include many transaction
    // this XML has a schema file located at http://SomeWebServer
    <Transaction ID="LotInfoInqReply" Action="ResultReply" FuncID="0005">    ~715
    // every transaction has 3 attributes for id name, action type = (Inquery or ResultReply), function id
    // and 2 elements header & Contents
    // these attributes are filled out by server here <Header sno="00101">
        // header has one attribute called serial number
        // and 2 elements From & Msg=Message
            <From node="MesServer" sys="MMS" />
            // 2 attributes here to indicate "from which server node = node and system = sys"
            <Msg rc="0" msg_id="000I">Normal End</Msg>
            // Message has 2 attributes and message data => here is "Normal End"
            // 1. return code = rc
            // 2. message id = msg_id
        </Header>
        <Contents>
        //contents may have many lots as its result
            <Lots>
            // one of its lot information result    ~732
                <Lot lot_id="ABC100.00">
                // lot has one attribue named lot id for replying result to client
                // and many other results in trems of elements
                    <HoldState txt="NotOnHold"/>
                    // for example: HoldState result with text data = "NotOnHold"
                    <any2 txt="reply stuff..."/>
                    // other result, if any
                    <any3 txt="reply stuff..."/>
                    // other result, if any
                </Lot>
            </Lots>
        </Contents>
</Transaction>
```

FIGURE 7

SYSTEM AND METHOD FOR DEFINING INTERFACE OF MANUFACTURE EXECUTION SYSTEM

CLAIM OF PRIORITY

This application claims the benefit, pursuant of 35 U.S.C. §119, of the earlier filing date of commonly owned patent application Ser. No. 92106107, filed on Mar. 19, 2003 in the Patent Office of the ROC, Taiwan.

BACKGROUND

1. Field of the Invention

This invention relates to Manufacturing Executing Systems (MES) and, more particularly, to a protocol used to communicate between servers and clients operating in a MES environment.

2. Glossary of Terms

The following terms and definitions are offered in order to facilitate understanding of the invention:

| | |
|---|---|
| CIM | Computer Integrated Manufacturing |
| CORBA | Common Object Request Broker Architecture is the OMG platform-independent technique for programs running on different machines to communicate with each other. |
| IDL | Interface Definition Language. Generally refers to the OMG/CORBA IDL. Used to define interfaces to objects. Defines the types of objects according to the operations that may be performed on them and the parameters to those operations. This is similar to a C++ header file. For example, in the CORBA context, an IDL compiler generates "stubs" that can be called by client code and skeletons for implementing server code. IDL compilers exist to map the IDL definitions into various languages: C, C++, Smalltalk, Java. |
| MES | Manufacturing Execution Systems |
| OMG | Object Management Group |
| SEMATECH | SEmiconductor MAnufacturing TECHnology: an international research consortium in which member companies cooperate precompetitively in key areas of semiconductor technology, sharing expenses and risk with the common aim of accelerating development of advanced manufacturing technologies. |
| SiView Standard | An integrated Manufacturing Execution System (MES) and equipment automation offering from IBM that is compatible with the SEMY/SEMATECH CIM Framework and Object Management Group (OMG) standards. It uses object-oriented technology with plug-and-play flexibility to permit fine tuning of operational performance as needed. |
| XML | eXtensible Markup Language: a W3C proposed recommendation. Like HTML, XML is a simplified profile of SGML, for creating markup languages. XML: may be used to define many different document types, each of which uses its own element type names. |
| HTML | Hyper Text Markup Language uses a single SGML document type, with a fixed set of element type names, i.e., "tag names," such as "html", "body", "h1", "ol". |
| SGML | An International Standard (ISO 8879) |

3. Background of the Art

In large manufacturing facilities, such as a semiconductor foundry in which many tools are required to build the wafer and chip product, there exist many complex software programs or packages that are used to run and monitor the performance of the tools. Many of these monitoring and control software packages are written to standards defined by the semiconductor equipment consortium SEMATEC. SEMATEC standards are typically used as they guide manufacturers in the way these programs should be implemented. The main framework for this system of software programs is known as the Computer Implemented Manufacturing (CIM) framework.

The overall control of the tools in the foundry is by a central computer or server having a Manufacturing Execution System (MES) tool control system. The central server has the information regarding each customer job that is currently being processed and ensures that each tool is performing the correct operation and in the appropriate sequence. This server communicates with users that monitor and control the production flow and operations on individual client workstations. A MES of the type suitable for this purpose is sold under the model name SiView and is published by International Business Machine Corp. (IBM) of Armonk, N.Y. SiView and IBM are registered trademarks of the IBM Corporation.

Figure 1:
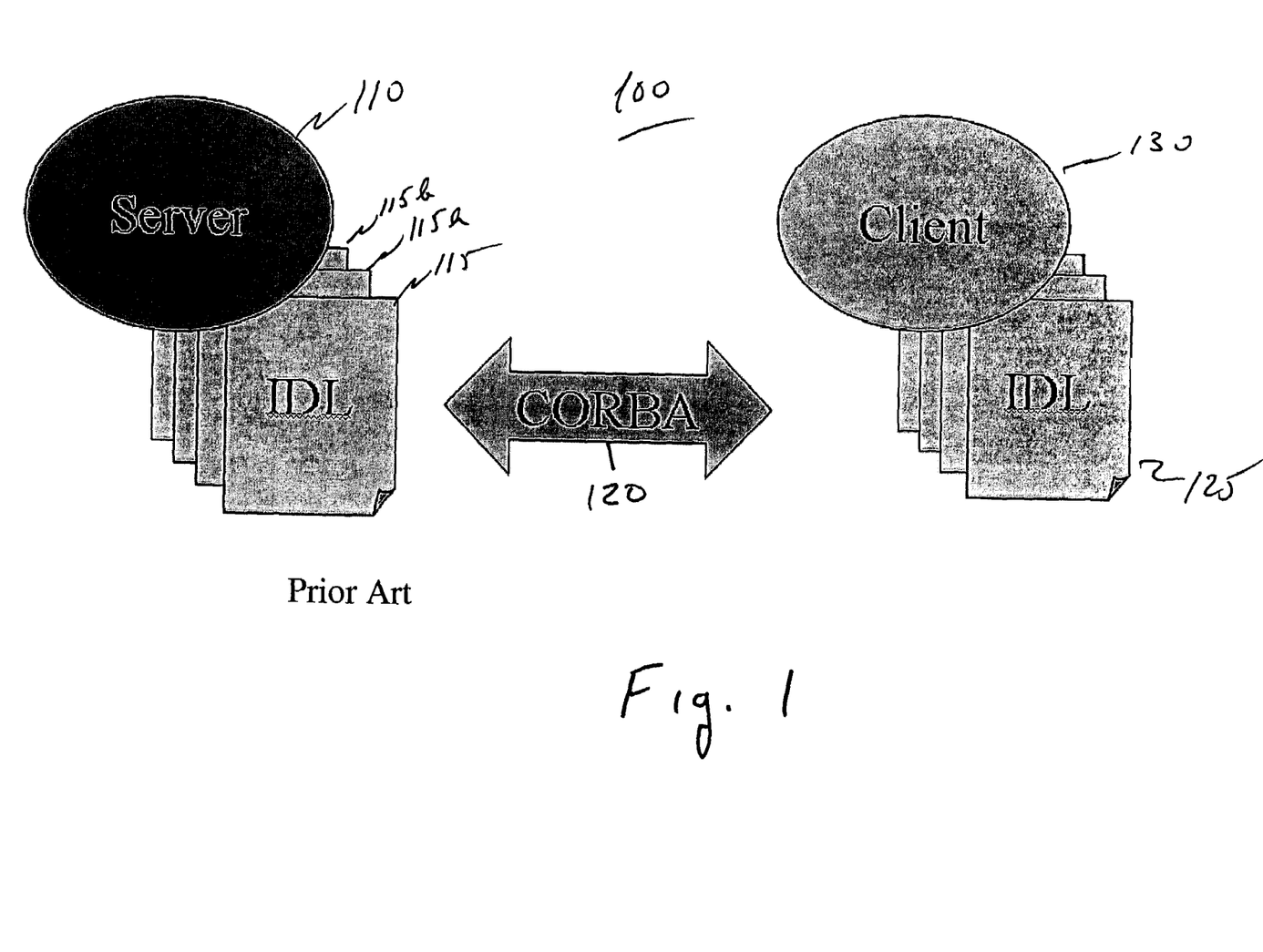
FIG. 1 is a system diagram of a conventional communication pathway.

Currently, one of the goals of SEMATECH is to adopt a distributed communications pathway and protocol that is referred to as Common Object Request Broker Architecture (CORBA). This system allows for the development of distributed systems to operate seamlessly in an integrated architecture while functioning on various independent platforms. MES architectures, such as SiView, are following the recommendations of SEMATECH and are transitioning over to CORBA. With reference to FIG. 1, an example of a communication pathway 100 using CORBA 120 connects server 110 and client device 130. Communication files are initiated through the CORBA communication pathway 120 using objects stored for use in a CORBA communication pathway using IDL files 115, 125.

While suitable for its intended purpose one drawback to the use of IDL is that complex monitoring and control tasks can result in the use of many objects or software modules resulting in a large collection of IDL files to accomplish a specific task. This build-up of IDL files 115, 115a, 115b, etc., over time, adds complexity and additional overhead to the communication pathway. For example, a server may initially provide for the monitoring of two functions, such as "lot track in" and "lot track out," wherein "lot track in" may be representative of a monitoring function that monitors the input of a product lot and "lot track out" may be representative of a monitoring function that monitors the output of the production lot. In this case the IDL file contains two methods. Over time, as the desire to monitor more features grows and the capability to monitor more features increases, more functions may be added to enhance the server's capability. For example, functions such as "lot information inquiry," "operation history inquiry," "tool information inquiry," "lot running hold" may be functions that are desired and added.

One method of organizing these new functions may be to develop categories of operations that include one IDL file per category. For example categories may be represented as:

Category 1-Action applied on lot;
Category 2-Information inquiry on lot;
Category 3-Action applied on tool;
Category 4-flow/routing setting; and
Category 5-modeling recipe manipulation Thus, an IDL file associated with Category 1 may monitor or track the input and output of material, for example. Category 2 may include an IDL file for a "query of lot information" or a "lot operation history." Category 3 may include an IDL file for setting or resetting the operation mode of a tool or for requesting a "tool operational status." Category 4 may include an IDL file for flow management or route settings and Category 5 may include an IDL file for modeling individual recipes.

However, an IDL file may become diverse and complex as new functions are added to the file. For example, an IDL file, entitled "File A" associated with category 1: (version 1.0), may monitor input and output using the following instructions shown here in the well known IDL programming language as:

```
File A: "basic_result_structure"
    Interface ActionOnLot {
        TrackInResult = TrackIn( );
        TrackOutResult = TrackOut( )
```

However, a user may need or desire additional actions such as "hold/release." In this case, IDL file, File A, may be modified as:

```
File A: "basic_result_structure"
    Interface ActionOnLot {
        TrackInResult = TrackIn( );
        TrackOutResult = TrackOut( );
        HoldResult=hold( );
        ReleaseResult=release( );
```

Users may desire to enhance the hold function with functions such as "future hold," "hold right now," and "hold after current operation complete." In this case, the IDL file, entitled "File A1," may be represented as:

```
File A1   include "file A"
          include "Enhanced_Result_Structure"
              interface enhancedActionOnLot : basicActionOnLot {
              future_hold_result = future_hold( );
              enhanced_hold_result_1 = hold(in string
                  Flag_HoldRightNow?);
              hold_next_result = hold_next( );
              enhanced_release_result = release(in string user_id);
              //check user id.
```

In this case "File A," which has many of the desired features, is included in the new process, "File A1." Thus, as new functions are added to the monitoring process, an increase in the complexity and number of the IDL statements naturally occurs. However, changes to basic IDL functions, such as File A, may cause operations of more complex functions to operate in an unexpected and undesired manner.

Accordingly, there is a need for a method and system that allows for improved monitoring and tracking capability without significant increase in the complexity of the programming instructions performing the monitoring operations.

SUMMARY

A system and method is disclosed for defining the interface of a manufacturing execution (MES). XML (Extensible Markup Language) is used to form an interface definition file and a XML tag-set file for simplifying the IDL (Interface Definition Language) files used by SiView MES that allows for the removal of Interface Repositories (IFR) so that each the server and clients need only maintain an XML tag-set file and Interface Definition File. Furthermore, an XML schema file is used for validating the contents of the XML output file. The system for defining the MES interface to process a transaction between a server, having an MES, and a client through an XML file based on a communication protocol, comprises an IDL file for executing a plurality of service objects of the MES, an XML tag set file, wherein the XML tag set file uses XML for defining interfaces of the plurality of service objects and an XML schema file, wherein the XML schema file is within a web server for validating an output content generated by executing IDL file and the XML tag set file, wherein the XML tag set file is adapted to serve at least one argument of the plurality of service objects within the IDL file.

It will be appreciated by those skilled in the art that with this new mechanism introduced above, the following benefits may be achieved:

message content of a transactional based MES utilized with a protocol suitable to that format can be projected onto a standard, well-organized XML format;

using XML as a remedy to eliminate or reduce handling of diverse IDL content as there is one single ASCII text typed IDL file composed and described by XML;

an XML object is made more portable and not limited to a single communication pathway.

BRIEF DESCRIPTION OF THE DRAWINGS

In the drawings:

FIG. 5b is an example of a header structure within an XML schema disclosed in FIG. 4;

FIG. 7 illustrates an exemplary XML schema for replying to the request for information shown in FIG. 6.

It is to be understood that these drawings are solely for purposes of illustrating the concepts of the invention and are not intended as a definition of the limits of the invention. The embodiments shown in the figures and described in the accompanying detailed description are to be used as illustrative embodiments, and should not be construed as the only manner of practicing the invention. It is to be understood that these drawings are for purposes of illustrating the concepts of the invention and are not to scale. Also, the same reference numerals, possibly supplemented with reference characters where appropriate, have been used to identify similar elements.

DETAILED DESCRIPTION

Figure 2A:
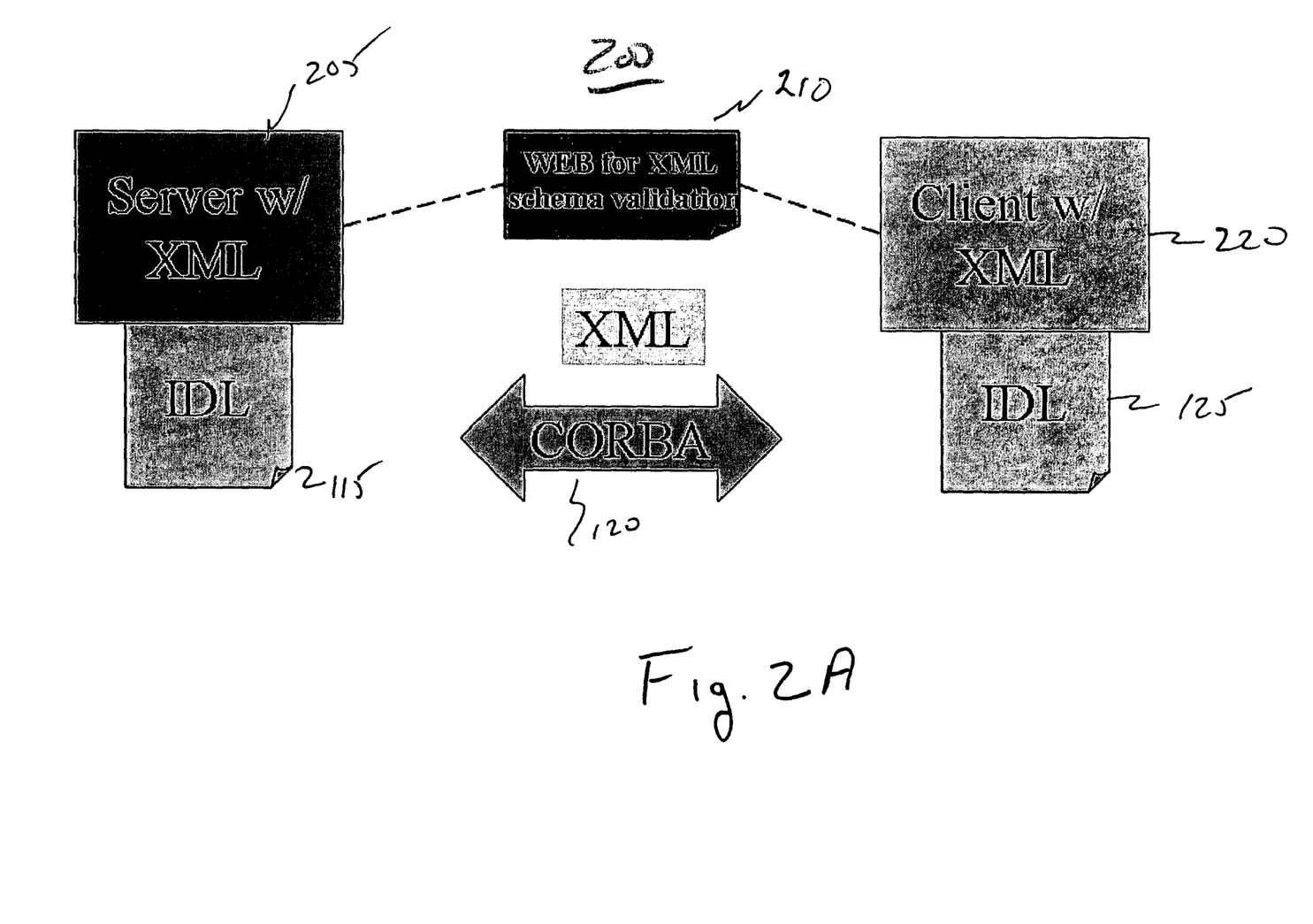
FIG. 2a is a system diagram of a communication pathway according to the present invention.

FIG. 2a illustrates an overview 200 of the use of XML in accordance with the principles of the present invention. In this overview, server 205 includes capability to use XML and IDL 115. In this case XML information is passed through Web for XML schema validation 210 to client 220. Client 220 also includes capability to use XML to unwrap the transferred information.

Figure 2B:
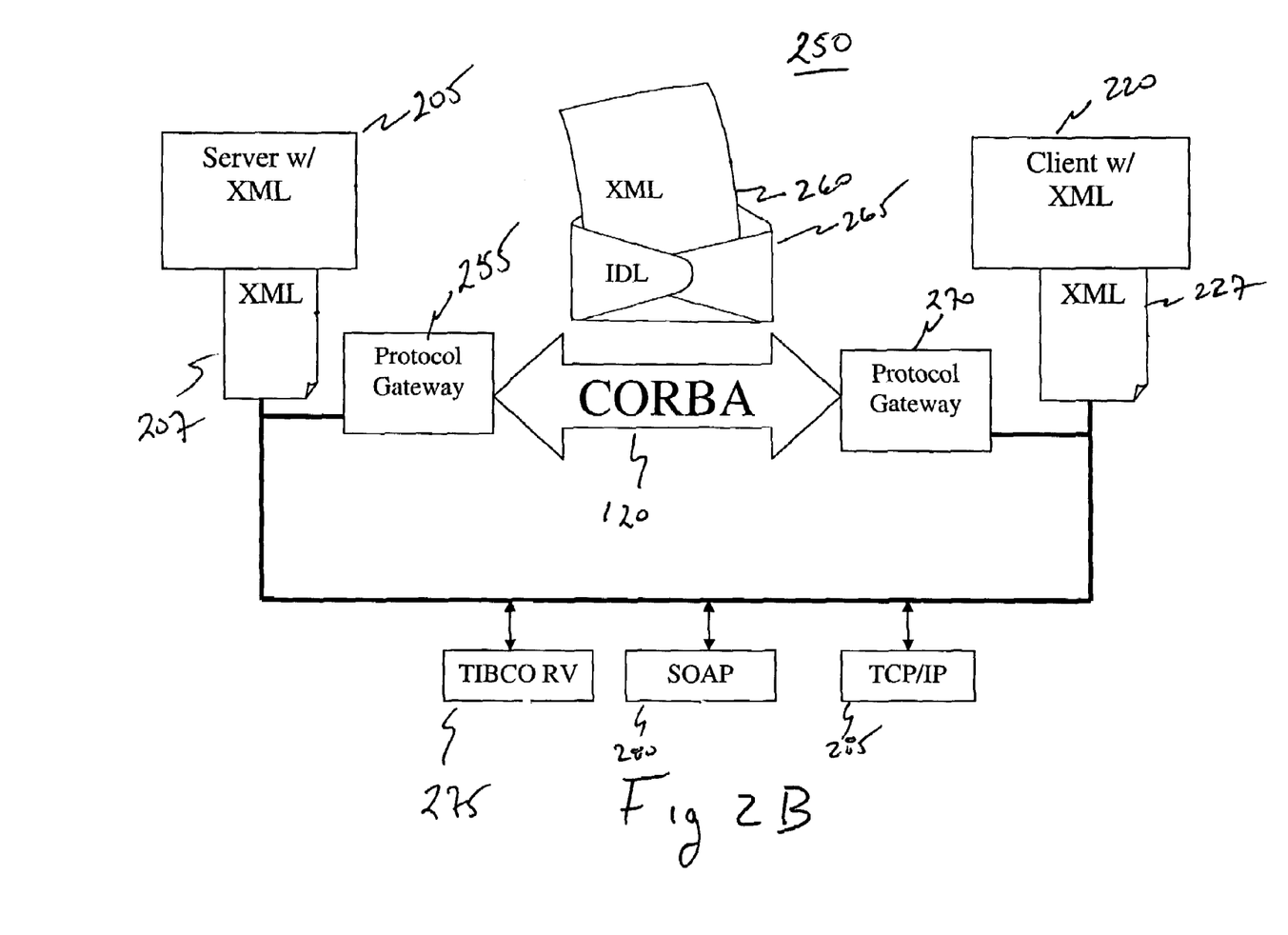
FIG. 2b is an alternate system diagram of a communication pathway according to the present invention.

FIG. 2b illustrates an alternative MES communication system 250 in accordance with the principles of the present invention. In this case, MES configuration 250 is shown including a server 205 and client 220 connected by a communication pathway 120 as previously discussed. Server 205 and client 220 are adapted to generate objects using an XML protocol layer 207 and 227 while the communication pathway 120 transmits objects using an IDL protocol layer. Protocol gateways 25, 270 are provided between the communication pathway 120 and the client 205 and server 220 wherein XML object 260, defined by the XML protocol, 207 for example, are stored in an IDL envelope 265 for transmission across the CORBA communication pathway 120. It will be appreciated by those skilled in the art that XML, a world wide standard, is supported by many IT vendors, such as IBM, MICROSOFT and SUN MICROSYSTEMS, and allows for objects 260 to be defined a pure text, self-described form. By using XML protocol layer 255, 270, XML objects 260 can be shared using many other communication pathways such as TCP/IP 50, TIBCO RV 52 and SOAP 54 without the need for conversion. TCP/IP is well known in the networking art and is composed of layers, wherein "IP" is responsible for moving a packet of data from network node to network node by forwarding each packet based on a four byte destination address (e.g., the IP number) and "TCP" is responsible for verifying the correct delivery of data from client to server.

Figure 3:
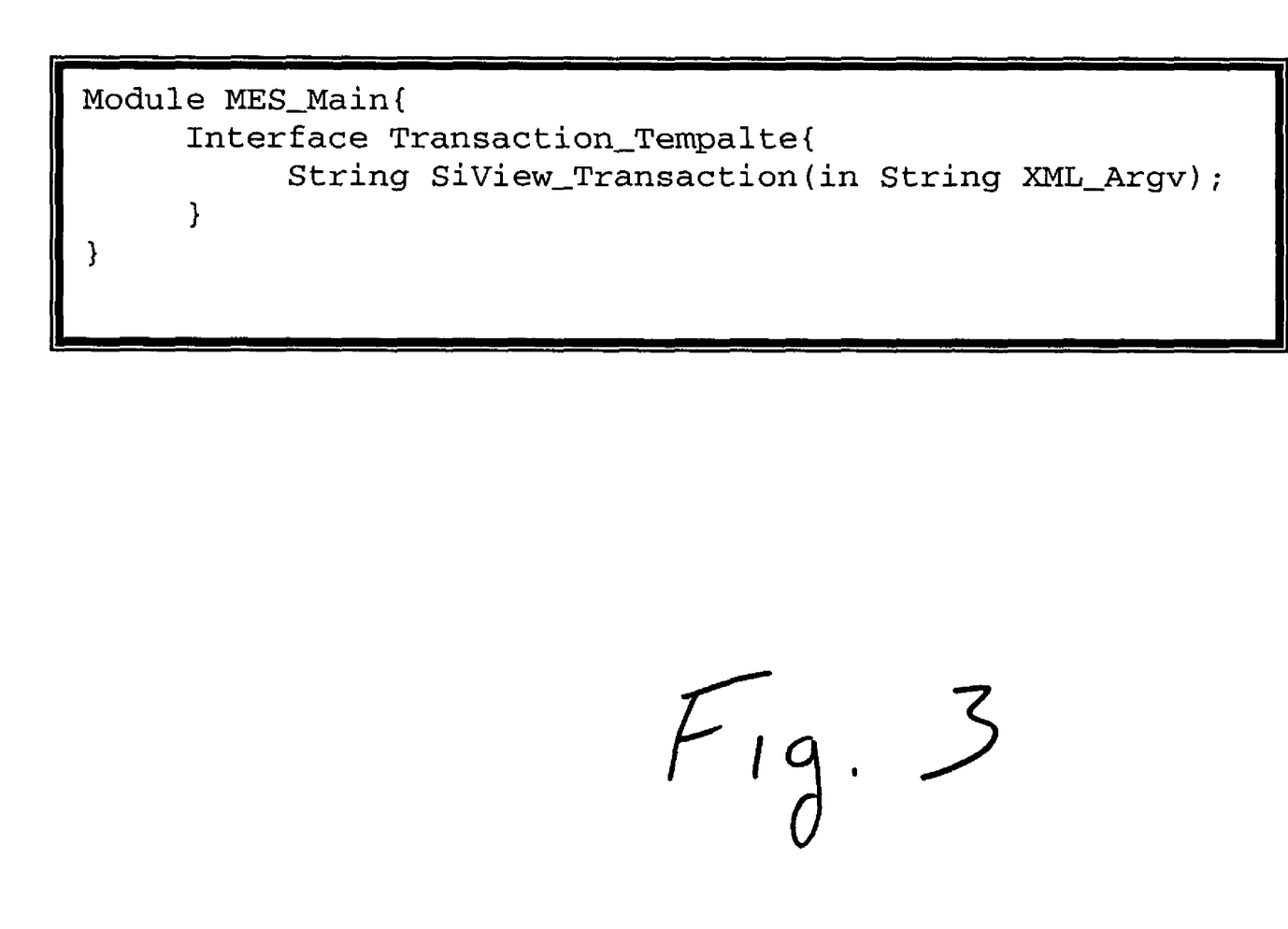
FIG. 3 is an example of an IDL envelope expressed in "C" programming language source code.

In accordance with the principles of the invention, the IDL file may be made invariant by describing one service that is to be provided by server 205. For example, FIG. 3 illustrates XML object, entitled SiView_Transaction, expressed in "C" programming language, which includes a single text input and a single text output. In this exemplary example, the input is an ASCII typed argument and the output is a string of ASCII characters. The input and output are described in XML format.

As one skilled in the art would recognize, a well-defined XML file is useful as the XML file infers the existence of a schema file that can perform content validation. By using this feature, several IDL files used in an MES, such as SiView, may be folded into a single well-defined XML file. For example, in a system, such as SiView, there may be transactional based MES with almost all text content. In this case, the objects may be more easily transformed or converted IDL to XML formats and gateways 255, 270, which may be performed by software routines on server 210 and the clients 220, respectively, operating as separate units, can encapsulate the XML defined object into an IDL envelope.

Figure 4:
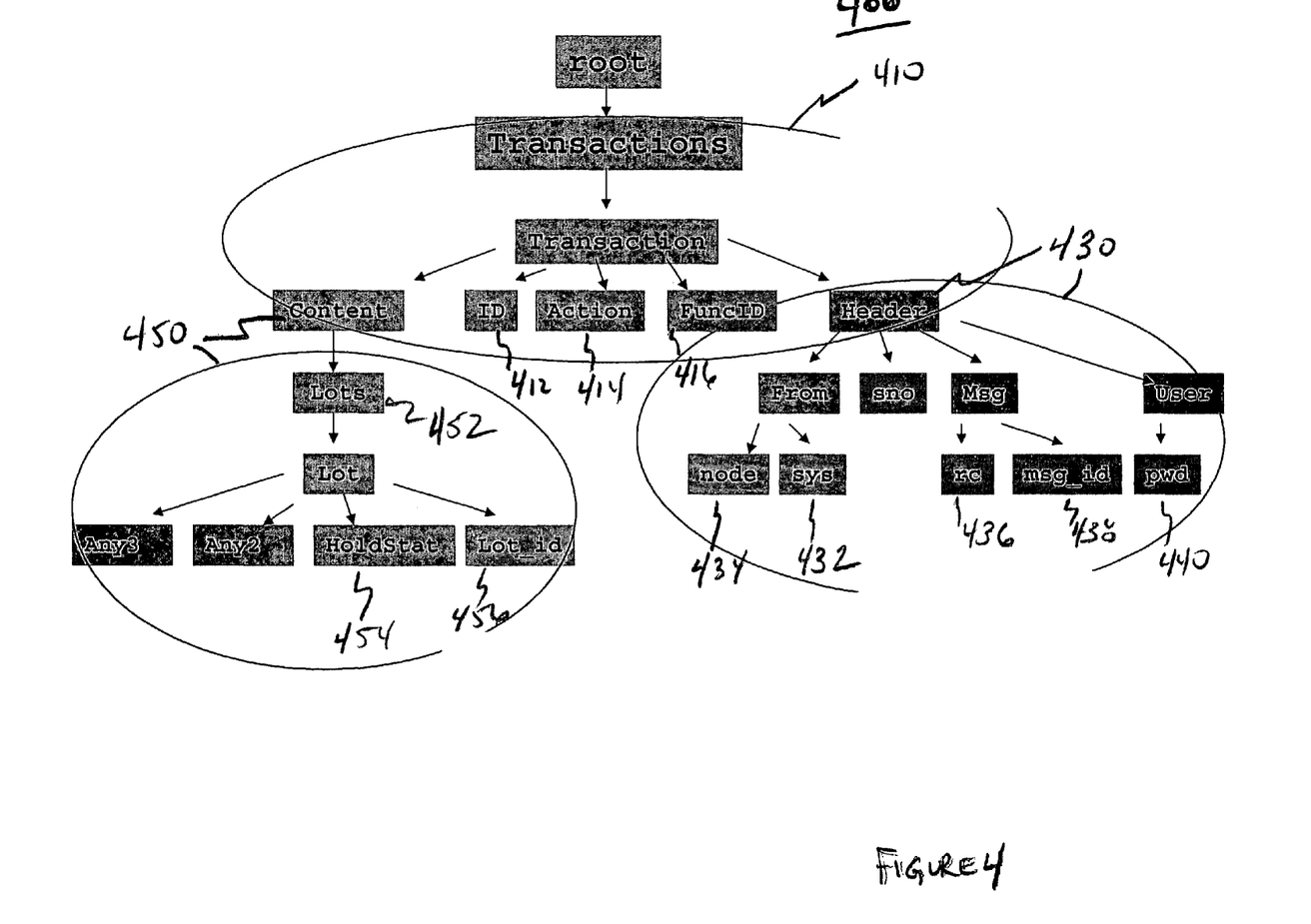
FIG. 4 is an exemplary structure for an XML schema in accordance with the principles of the invention.

FIG. 4 illustrates a schema structure 400 having a transaction region 410 that includes a header region 430 and a content region 450. The transaction region 410 includes information common to the transaction performed. For example, transaction region 410 may include information associated with identification 412, an action 414 to be performed or a function identification 416. The transaction region 410 further includes information with regard to header region 430 and content region 450.

Header region 430 includes information regarding a source, e.g., system 432 and node 434, and information regarding any message, i.e., rc 436 or message identification 438, that is required. Header 430 may further include information regarding a user, e.g. pwd 440.

Content region 450 includes information regarding a particular production lot 452. For example, lot 452 may include information regarding whether there is a hold status 454 request or a lot identification 456. Similarly, other information, referred to as any2, 452, and any3, 454 may be defined.

Figure 5A:
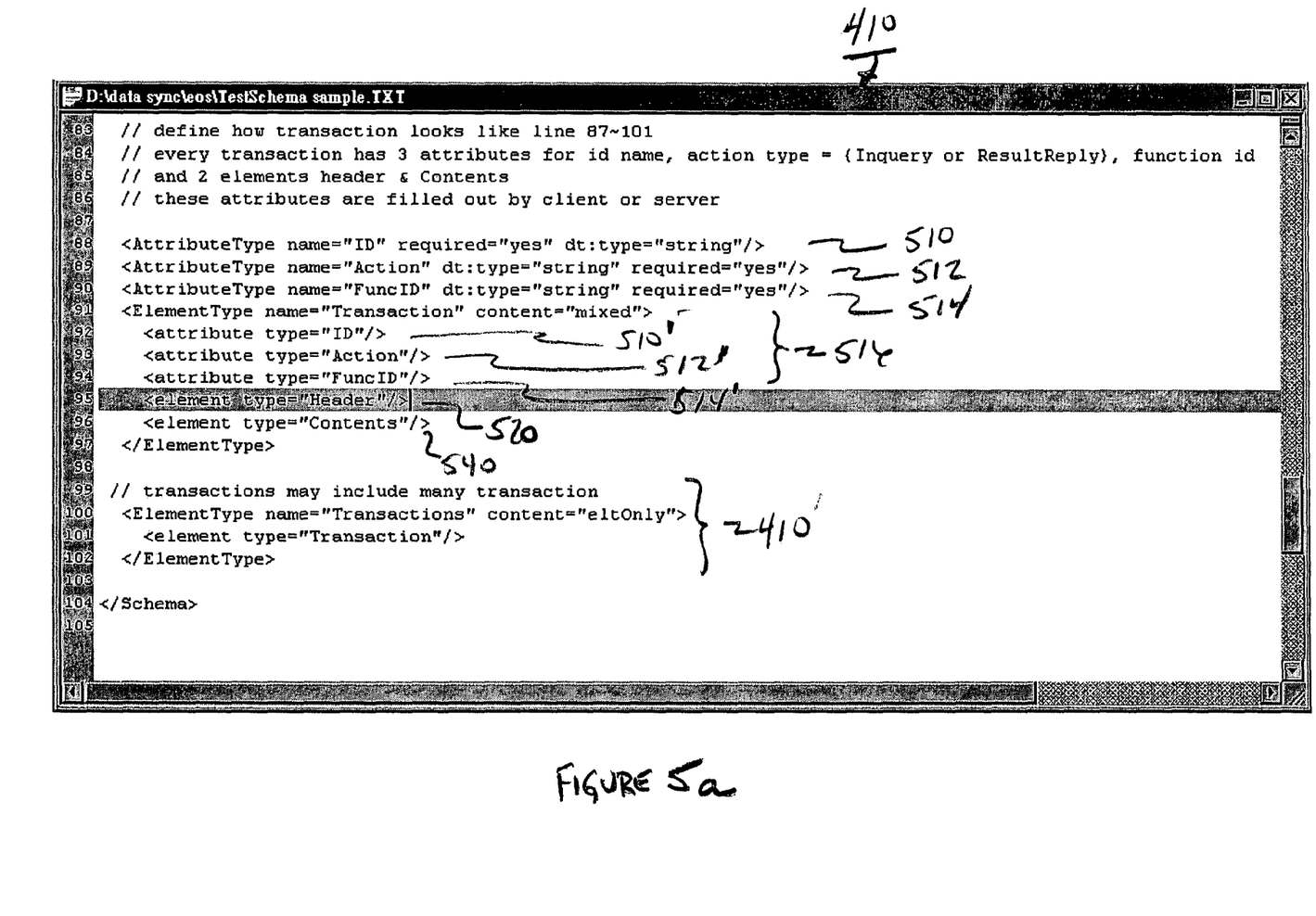
FIG. 5a is an example of a transaction structure within an XML schema disclosed in FIG. 4.

FIG. 5a illustrates an example of a transaction region 410 of a sample XML schema in accordance with the principles of the invention. In this exemplary transaction region 410, three attributes are identified, "id name" 510, "action" 512 and "function id" 514, that enables a user to provide input. For example, attribute "id name", is identified or typed as requiring a "string," of conventional alphanumeric values that may be entered by a user or may be read from a file. Similarly, attributes "action" 512 and "function id" 514 are typed as requiring similar "string" inputs. The element "transaction" 516 is identified as including the attributes "id name," "action" and "function id", which are represented as 510', 512' and 514', respectively.

Figure 5C:
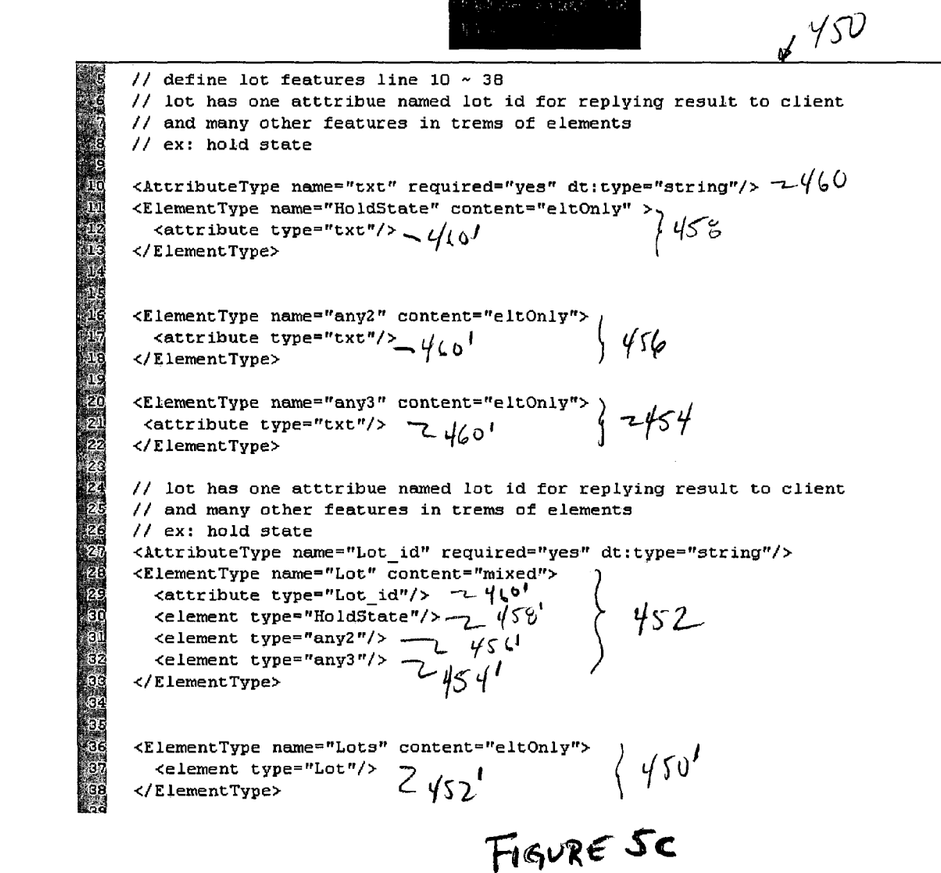
FIG. 5c is an example of a content structure within an XML schema disclosed in FIG. 4.

Transaction region 410 further defines the elements "Header" 520 and "Content" 540, which are more fully explained with regard to FIG. 5b and 5c, respectively. As one skilled in the art would appreciate, transaction region 410 may contain more than one transaction region, which is illustrated as 410'. Each transaction region may define different attribute types and header and content elements.

FIG. 5b illustrates an example of a header element 430 of a sample XML schema in accordance with the principles of the invention. In this exemplary header element 430, the element "msg" 436 is identified and typed as including two attributes, "rc" and "msg_id," which are represented as 432' and 434', respectively. Attributes "rc" and "msg_id" are identified and typed, at 432 and 434, respectively, as being "string" values. Similarly, the element "from" 438 is identified and typed as including two attributes, "node" and "sys", represented as 440' and 442', respectively. In this illustrated example, header element 410 further includes a user element 444 containing a single attribute "pwd", represented as 446'. Attribute "pwd" is identified and typed as a "string" data type, represented as 446.

The header element 430' is next identified and typed as containing three elements, "from" 438, "msg" 436 and "user" 444, and one attribute "sno" 448'. Attribute "sno", i.e., serial number, is identified and typed as a "string" data type 448.

FIG. 5b illustrates a similar structure for content element 450. In this case, content element 450, illustrated as 450', includes a single element 452', referred to as "lot". Element "lot" 452 is then identified and typed as including three elements, "any3" 454', any2, 456' and "holdstate" 458' and one attribute, "lot_id" 460'. In this case, attribute "lot_id" 460 is used to provide information to the user and is identified and typed as a "string" data type. Furthermore, elements "any3" 454, "any2" 456 and "holdstate" 468 include a single attribute "txt", shown as 460'. Attribute "txt" is identified as a "string" data type 460.

Figure 6:
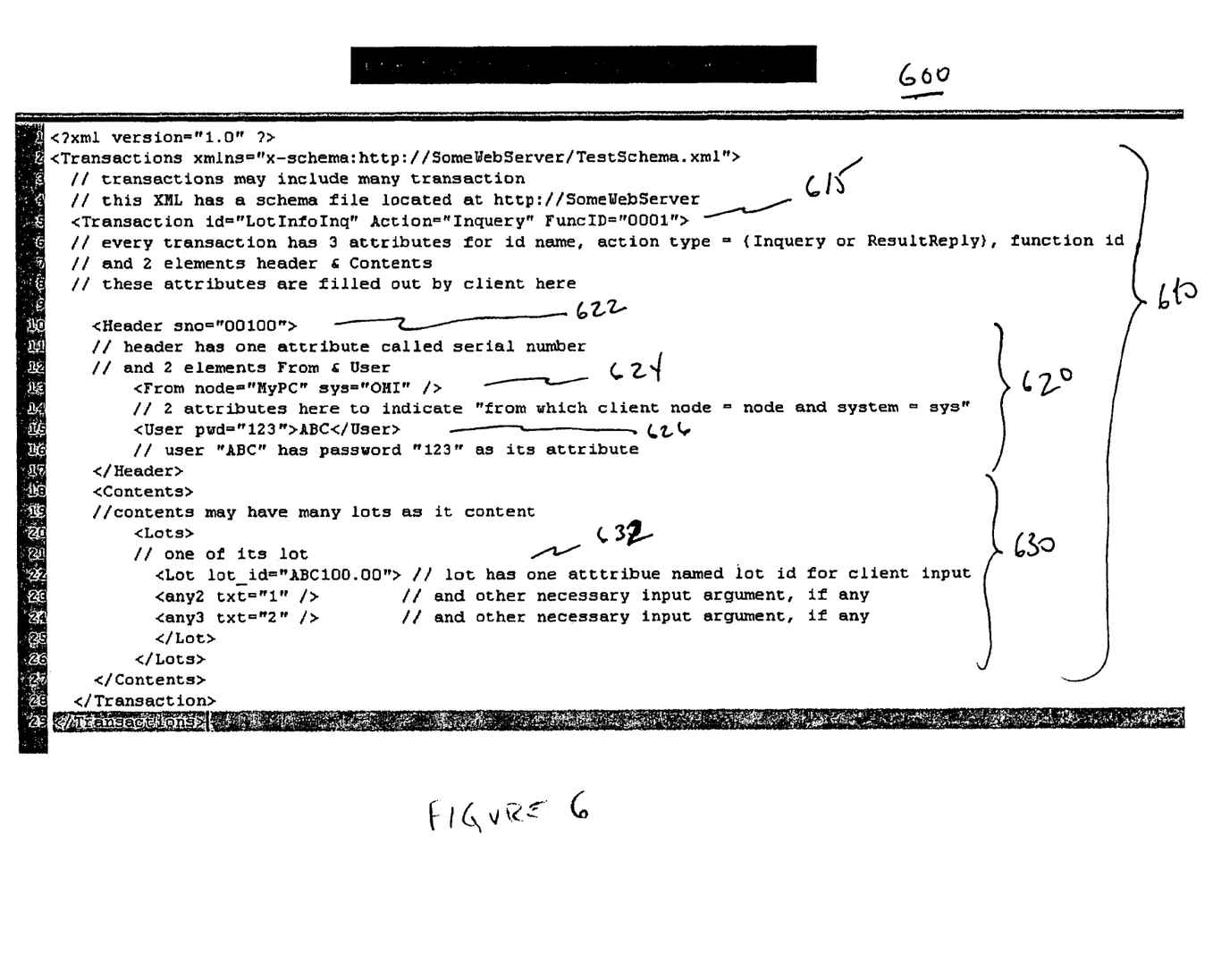
FIG. 6 illustrates an exemplary XML schema for requesting information from a server in accordance with the principles of the invention.

FIG. 6 illustrates a schema 600 requesting a server to provide information regarding a specific "lot." In this exemplary schema, transaction 610 includes three attributes, Transaction Id, Action and Func Id that are defined as "lotInfoInq", "Inquery" and "0001", respectively, at line 615. A Header section 620 includes a single attribute "sno" equal to "00100" at line 622, and two elements From Node and sys equal to "MyPC" and "OMI" at line 624. At line 626, a user password, identified as ABC and set to "123" is illustrated as an example.

A content section 630 is shown having a Lot_id set to ABC100.00.00 at line 632. Additional textual information, presented as Any2 and Any3 may be included in the header section.

FIG. 7 illustrates an exemplary schema 700 for a server replying to the request schema shown in FIG. 6. In this exemplary schema, transaction region 710 includes three attributes: Transaction Id, Action and Func Id, which are set to "LotInfoInqReply", "ResultReply" and "0005," respectively. Header section 720 includes a single attribute "sno" that identifies the header at line 722. It further includes two elements, From and Msg. A content section 730 includes one attribute Lot_id at line 732 for returning the results to the client. Content section 730 may include additional information, shown as any2 and any3, at lines 734 and 736 respectively.

While the invention has been described with reference to the preferred embodiments thereof, it will be appreciated by those of ordinary skill in the art that modifications can be made to the parts that comprise the invention without departing from the spirit and scope thereof, as defined by the claims.

What is claimed is:

1. A system for defining an MES interface to process a transaction between a server and a client from an XML base, the transaction between the server and the client based on a communication protocol, the server having a MES, said system comprising:
    an IDL file for executing a plurality of service objects of the MES;
    an XML tag set file, wherein the XML tag set file uses XML for defining interfaces of the plurality of service objects; and
    an XML schema file, wherein the XML schema file is within a web server for validating an output content generated by executing IDL file and the XML tag set file, wherein the XML tag set file is adapted to serve at least one argument of the plurality of service objects within the IDL file.

2. The system of claim 1, wherein the MES is SiView MES provided by IBM.

3. The system of claim 1, wherein the communication protocol is CORBA.

4. The system of claim 1, wherein the communication protocol is TCP/IP.

5. The system of claim 1, wherein the communication protocol is TIBCO RV.

6. The system of claim 1, wherein the communication protocol is SOAP.

7. A system for defining MES interface in order to process a transaction between a server and a client from an XML base, the transaction between the server and the client based on CORBA, the server having a SiView MES provided by IBM, the system for defining MES interface comprising:
    an IDL file for executing a plurality of service objects of the SiView MES;
    an XML tag set file, wherein the XML tag set file uses XML for defining interfaces of the plurality of service objects; and
    an XML schema file, wherein the XML schema file is within a web server for validating an output content generated by executing IDL file and the XML tag set file, wherein the XML tag set file is adapted to serve at least one argument of the plurality of service objects within the IDL file.

8. A method for defining an MES interface to process a transaction between a server and a client from an XML base, the transaction between the server and the client based on a communication protocol, the server having a MES, the method for defining MES interface comprising:
    providing an IDL file and an XML tag set file within the server and client, wherein the IDL file serves for executing a plurality of service objects of the MES and the XML tag set file uses XML for defining interfaces of the plurality of service objects;
    executing the IDL file and an XML tag set file for generating an XML output file, wherein the XML tag set file is adapted to serve at least one argument of the plurality of service objects within the IDL file;
    providing an XML schema file within a web server; and
    executing the XML schema file for validating a content of the XML output file.

9. The method of claim 1, wherein the MES is SiView MES provided by IBM.

10. The method of claim 1, wherein the communication protocol is CORBA.

11. The method of claim 1, wherein the communication protocol is TCP/IP.

12. The method of claim 1, wherein the communication protocol is TIBCO RV.

13. The method of claim 1, wherein the communication protocol is SOAP.

* * * * *